(12) United States Patent
Li et al.

(10) Patent No.: US 10,535,163 B2
(45) Date of Patent: Jan. 14, 2020

(54) AVATAR DIGITIZATION FROM A SINGLE IMAGE FOR REAL-TIME RENDERING

(71) Applicant: Pinscreen, Inc., Westlake Village, CA (US)

(72) Inventors: Hao Li, Santa Monica, CA (US);
Liwen Hu, Los Angeles, CA (US);
Lingyu Wei, Los Angeles, CA (US);
Koki Nagano, Los Angeles, CA (US);
Jaewoo Seo, Los Angeles, CA (US);
Jens Fursund, Copenhagen (DK);
Shunsuke Saito, Los Angeles, CA (US)

(73) Assignee: Pinscreen, Inc., Los Angeles, CA (US)

( * ) Notice: Subject to any disclaimer, the term of this patent is extended or adjusted under 35 U.S.C. 154(b) by 0 days.

(21) Appl. No.: 16/119,907

(22) Filed: Aug. 31, 2018

(65) Prior Publication Data
US 2018/0374242 A1  Dec. 27, 2018

Related U.S. Application Data

(63) Continuation-in-part of application No. 15/829,064, filed on Dec. 1, 2017.
(Continued)

(51) Int. Cl.
| | |
|---|---|
| *G06T 11/00* | (2006.01) |
| *G06T 15/00* | (2011.01) |
| *G06T 17/20* | (2006.01) |
| *G06T 7/11* | (2017.01) |
| *G06N 3/08* | (2006.01) |
| *G06N 5/04* | (2006.01) |
| *G06K 9/00* | (2006.01) |

(52) U.S. Cl.
CPC ........ *G06T 11/001* (2013.01); *G06K 9/00248* (2013.01); *G06N 3/084* (2013.01); *G06N 5/04* (2013.01); *G06T 7/11* (2017.01); *G06T 15/005* (2013.01); *G06T 17/20* (2013.01); *G06T 2207/30201* (2013.01)

(58) Field of Classification Search
CPC ...... G06N 20/00; G06N 5/025; G06N 3/0454; G06N 3/08
USPC ....... 382/115, 118, 128, 154, 156, 159, 165, 382/170, 209; 340/5.81, 582, 5.83; 902/3, 5
See application file for complete search history.

(56) References Cited

U.S. PATENT DOCUMENTS

| | | | |
|---|---|---|---|
| 6,873,714 B2 * | 3/2005 | Witt | A61B 3/113 382/118 |
| 6,876,754 B1 * | 4/2005 | Kellner | G06T 11/00 382/103 |

(Continued)

*Primary Examiner* — Yosef Kassa
(74) *Attorney, Agent, or Firm* — Socal IP Law Group LLP; Jonathan Pearce

(57) ABSTRACT

A system for generating three-dimensional facial models including photorealistic hair and facial textures includes creating a facial model with reliance upon neural networks based upon a single two-dimensional input image. The photorealistic hair is created by finding a subset of similar three-dimensional polystrip hairstyles from a large database of polystrip hairstyles, selecting the most-alike polystrip hairstyle, deforming that polystrip hairstyle to better fit the hair of the two-dimensional image. Then, collisions and bald spots are corrected, and suitable textures are applied. Finally, the facial model and polystrip hairstyle are combined into a final three-dimensional avatar.

19 Claims, 13 Drawing Sheets

Related U.S. Application Data

(60) Provisional application No. 62/428,975, filed on Dec. 1, 2016, provisional application No. 62/556,244, filed on Sep. 8, 2017.

(56) References Cited

U.S. PATENT DOCUMENTS

| | | | | |
|---|---|---|---|---|
| 7,103,218 B2* | 9/2006 | Chen | ................. | G06K 9/00228 |
| | | | | 382/170 |
| 7,940,956 B2* | 5/2011 | Kinoshita | ............. | G01S 3/7864 |
| | | | | 348/169 |
| 8,655,030 B2* | 2/2014 | Li | ..................... | G06K 9/00724 |
| | | | | 382/118 |
| 9,092,663 B2* | 7/2015 | Kono | ................ | G07C 9/00158 |

* cited by examiner

AVATAR DIGITIZATION FROM A SINGLE IMAGE FOR REAL-TIME RENDERING

RELATED APPLICATION INFORMATION

This patent claims priority from U.S. provisional patent application No. 62/556,244 entitled "Avatar Digitization from a Single Image for Real-Time Rendering" filed Sep. 8, 2017.

This patent also claims priority to and is a continuation-in-part of U.S. patent application Ser. No. 15/829,064 entitled "Photorealistic Facial Texture Inference Using Deep Neural Networks" filed Dec. 1, 2017 and the corresponding PCT Application No.: PCT/US17/64239 entitled "Photorealistic Facial Texture Inference Using Deep Neural Networks" filed Dec. 1, 2017, both of which claim priority from U.S. provisional patent application No. 62/428,975 entitled "Photorealistic Facial Texture Inference Using Deep Neural Networks" filed Dec. 1, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the creation of a realistic digital avatar including facial features and hair textures based upon a single image. The processes and systems described herein rely, at least in part, upon machine learning using deep neural networks.

Description of the Related Art

One aspect of three-dimensional rendering of human faces, that has persisted in its difficulty has been facial textures. Simply generating and rendering an overall facial shape that largely corresponds to the facial shape of a particular person or to a modelled person has been relatively straightforward for a number of years.

Microsoft® Kinect®-like infrared scanners with mass market penetration have been capable of using infrared light and associated cameras to develop facial models for a number of years. In more scientific or serious creative spaces, complex rigs of cameras, lighting, and three-dimensional capture systems have been able to generate extremely detailed three-dimensional maps of individual faces for years as well.

However, facial textures, including pores, hairs, stubble, and similar details, have only recently become capable of being modelled. To do so, very high-resolution infrared cameras, lighting and specialized systems are required. These systems map every inch of texture of a human face, then model it in three dimensions. The results are extremely accurate, but the cost of creating them is also extremely high. One must spend entire days or half-days with the setup, scanning and ensuring that the results are sufficient for the desired purposes. As a result, these types of capabilities are typically only available to motion picture studios or to video game creators who wish to represent actors physically within the game world.

The addition of hair to the three-dimensional model is still more complicated. Hair is a dominate feature of any three-dimensional head avatar. As a result, high-quality hair is important to any three-dimensional avatar of any convincing quality. However, hair's three-dimensionality is quite complex, since it is made up of literally thousands of individual strands.

It is possible to create very complex and lifelike hair for almost any three-dimensional avatar. The most obvious way is to carefully hand-draw and design individual strands of hair or groups of stands of hair and for an artist to place them manually on a three-dimensional avatar's head. The problem is that to generate convincing hair like this is extremely time-consuming.

Alternatively, complex rigs of cameras and depth sensors can generate detailed three-dimensional images of an individual's head, then extrapolate out a suitable hair style from the resulting images and depth maps. However, these rigs are expensive and complex to operate. So, their availability to the general public is low. And, for most applications, the detail is unnecessary.

Figure 1:
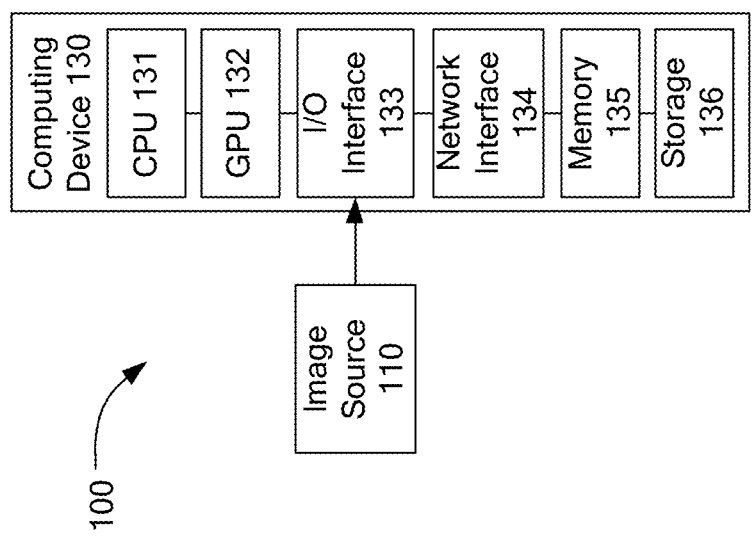
FIG. 1 is a structural diagram of a system for avatar digitization.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

It is therefore desirable to create high-resolution facial textures from individual photographs without the need for specialized equipment or significant pre-planning. Likewise, topping these facial textures with lifelike hairstyles is also desirable from that same, single photograph. The present system enables that process to take place through the application of deep neural networks and draws inferences from as little as a single facial photograph in any pose.

Part of the difficulty in correctly detecting facial texture from a single image is a lack of resolution showing the texture, and that most facial pictures are posed in such a way that large portions of an individual's face are not visible in the image. Thus, actual recreation of facial texture for the entire face must first actually recreate the entire face geometry before facial texture recreation is even possible.

In order to enable this process, the system draws upon a trained neural network of facial textural features that can be used to devolve a single image into a substantial estimation of the facial features, pose, and three-dimensional facial shape that led to the single image. In particular, the system examines the input of a single image, selects an associated pose, generates a three-dimensional model, and then generates albedo maps. Then, the system relies upon a trained neural network based upon hundreds or thousands of real human faces to select facial textures that appear most like the textures visible in the input image.

As used herein, the words "facial texture" and "texture," unless otherwise shown from the context, mean mesoscopic details of a human face. These phrases do not mean large features such as eyes, nose, ears, lips, or teeth. However, these phrases do mean each individual strand of stubble or beard, individual pores, freckles, pigmentation, pock marks or acne scars, and other small variations in facial skin three-dimensional data that account for an overall dithered or varied look to all human skin. Such features typically have been uncommon in all but the best computer models of faces. The absence of facial textures in most facial three-dimensional models is one aspect of the so-called "uncanny valley" in video game characters which look a great deal like their human counterparts, but are sufficiently distinct as to appear not-quite-right to a casual observer.

Though the result of this system may not be a literal match of facial texture from the individual, it is a very convincing facsimile. As a result of the application of hundreds or thousands of facial texture images in training the neural network, the result is incredibly lifelike and accurate to human skin of virtually all types. The three-dimensional models generated from a single image are photorealistic and generally match well with real-life images of that person in other poses and are high-quality and high-resolution renderings of those individual's faces.

The hairstyle may likewise be generated from that same, single photograph. Though there are a large number of potential hairstyles, the list may be narrowed, and a similar three-dimensional polystrip hairstyle may be selected based upon characteristics of the detected hairstyle. These polystrip hairstyles may be pre-generated by an artist to correspond to a typical set of hairstyles or to pre-rendered hairstyles that correspond to known hairstyles.

As used herein "polystrip" means a three-dimensional shape rendered by a graphics processor that has at least four solid sides to which a texture map (e.g. a bitmap, or other image) may be applied. The "polystrip" as used herein is an elongate three-dimensional shape with at least two wide (at least double the width of the other two sides) and long (at least double the length of the two wide sides) sides, and at least two long (the same length as the long sides), but very narrow (at least half the width of the wide) sides. A polystrip may have no depth at all, being effectively a short or long three-dimensional ribbon to which a texture may be applied.

Polystrips may be used to enable ease of rendering by computers, while providing for volume and movement of the hair when combined with texture and alpha masks for the polystrips. Even with a large polystrip hairstyle databases, every hairstyle will not be accounted for in any database. Therefore, as a beneficial property of the polystrips, the individual polystrip attributes may be altered by changing the three-dimensional characteristics of the polystrips to better match a desired hairstyle. Furthermore, additional polystrips may be added in order to cover any unusual bald spots or patchiness that results from the alteration of the three-dimensional characteristics of the polystrips. An alpha mask of an appropriate hair type may be added to the polystrips to generate a high-quality, but quickly-rendered polystrip hairstyle for a three-dimensional facial avatar.

Then, the facial map and polystrip hairstyle may be combined into a three-dimensional avatar including the facial texture and a lifelike reproduction of the hair shown in the single photograph. Because the overall process relies upon a single image, and operates using neural networks and hairstyle attribute databases, it is relatively low-complexity and may be accomplished in a very short time from a single image on conventional computer hardware. In the near future, mobile devices will operate with sufficient power to create avatars in this fashion.

Description of Apparatus

Turning first to FIG. 1, a structural diagram of a system for avatar generation is shown. The system 100 includes an image source 110, and a computing device 130. Multiple computing devices may be used, but only one is required. And, the image source 110 may be storage (e.g. storage 136) on the computing device 130 itself or may be external.

The image source 110 may be a still camera or a video camera capturing an image. The image source may be a short term or long-term storage device holding data that represents images. For example, the image source 110 may be a database of images, may be the Internet, or may be any number of other sources of image data. The associated image data, as discussed more fully below, is explicitly not an image generated using any complex lighting or capture system, or any high-resolution depth sensors such that any actual facial texture data is contained within the image data itself. Instead, the image is a typical, two-dimensional image format such as PNG, JPG, BMP, and may be in almost any resolution, so long as a face is recognizable as human.

The computing device 130 includes a central processing unit (CPU) 131, a graphics processing unit (GPU) 132, an input-output (I/O) interface 133, a network interface 134, memory 135, and storage 136.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or systems-on-a-chip (SOCs).

The CPU 131 may be specialized, designed for operations upon visual, graphical, or audio data, or may be general purpose processors. Though identified as a central processing unit, the CPU 131 may be multiple processors, for example, multi-core processors or a series of processors joined by a bus to increase the overall throughput or capabilities of the CPU 131.

The GPU 132 may execute instructions suitable for enabling the functions described herein. In particular, the GPU 132 may be used in connection with particular image-related operations which the GPU 132 is uniquely suited to perform. The GPU 132 may be any of the things that the CPU 131 is. However, the GPU 132 is distinct in that it is a specialized processor that is designed for the purpose of processing visual data, particularly vector and shading, and performs faster memory operations and access, along with performing specialized lighting operations. The instruction sets and memory in the GPU 132 are specifically designed for operation upon graphical data. In this way, the GPU 132 may be especially suited to operation upon the image data or to quickly and efficiently performing the complex mathematical operations described herein. Like the CPU 131, the GPU 132 is shown as a single graphics processing unit, but may be one or more graphics processing units in a so-called multi-core format, or linked by a bus or other connection that may together be applied to a single set of or to multiple processing operations.

The I/O interface 133 may include one or more general purpose wired interfaces (e.g. a universal serial bus (USB), high definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g. a multicore process or group of multicore processors) or a group of GPUs (e.g. a single powerful GPU or a set of GPUs interconnected by SLI or CrossFire®) such that a connected computing device is better-capable of performing processor-intensive tasks such as the convolution or segmentation processes discussed more fully below. In some implementations, the one or more additional computing devices may be used to perform more processor-intensive tasks, with the tasks being offloaded via the I/O interface 133 or network interface 134. In particular, the training processes discussed herein may rely upon external computing devices.

Figure 2:
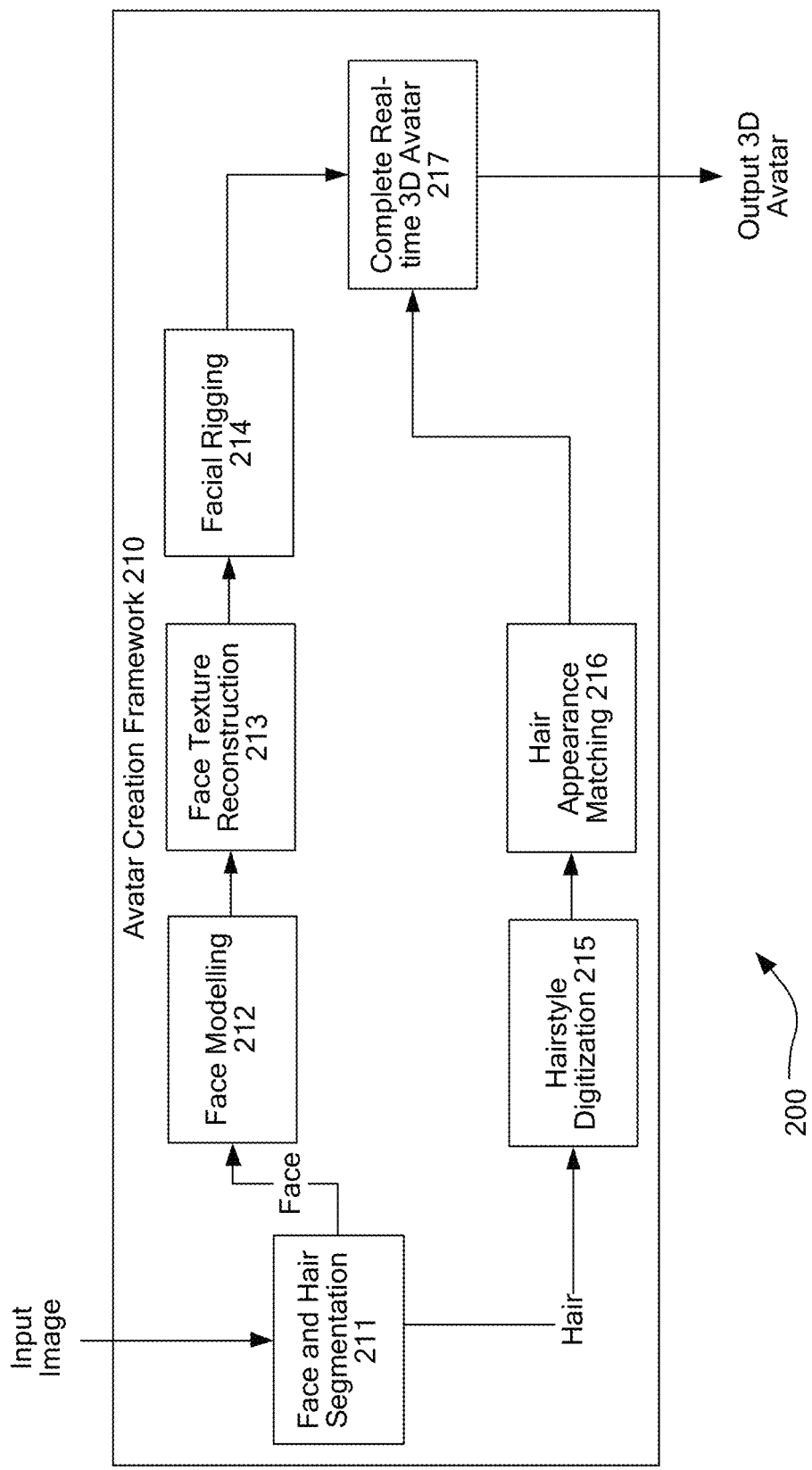
FIG. 2 is a functional diagram of an avatar creation framework for a system for avatar digitization.

FIG. 2 is a functional diagram of an avatar creation framework for a system 200 for avatar digitization. The system relies upon a single input image.

The system first uses a face and hair segmentation 211 system to differentiate between the facial regions and the hair regions of the input image. Because the facial modelling system (described below) relies upon a neural network, non-visible (e.g. occluded) portions may be extrapolated using the trained neural network. At the segmentation stage, it is important to merely differentiate between the visible regions of the image that are facial regions and hair regions. The process of segmenting facial regions and hair regions is described in the co-pending U.S. patent application Ser. No. 15/438,551 entitled "Real-Time Facial Segmentation and Performance Capture from RGB Input" filed Feb. 21, 2017 by the assignee of this patent. That system discusses segmentation of the face from other non-facial regions, but the same system may be employed to segment hair from other non-hair regions in much the same fashion.

The training of the face and hair segmentation 211 may take place ahead of time such that the system is ready to perform both operations when an input image is received. The system includes a series of components discussed in that application, including a convolutional neural network. The trained network that is a part of the face and hair segmentation 211 system enables this segmentation to take place very quickly and with very limited computational overhead.

Thereafter, the two image portions, namely the hair region and the face region, are operated upon separately by the hair digitization 215 and face modelling 212 systems, respectively. Processing by face modelling 212 is followed by processing by the face texture reconstruction 213 system and facial rigging 214 system. These systems correspond, in large part, to systems described in co-pending U.S. patent application Ser. No. 15/829,064 entitled "Photorealistic Facial Texture Inference Using Deep Neural Networks" filed Dec. 1, 2017.

The face modelling 212 system uses the segmented face to generate a three-dimensional model of the face (without any visible texture). This system is described in more detail below with reference to FIG. 3. The face texture reconstruction 213 system creates a texture map that may be overlaid on the three-dimensional model of the face created by face modelling 212. This system is discussed more fully below with respect to FIG. 4.

The facial rigging 214 system is a separate system that adds an underlying structure to the three-dimensional facial model, now including a facial texture, so that the face may be altered by animation techniques. This system may add teeth, a jaw, eyelids that move, lips that function for speech and emoting. The facial rigging 214 system relies upon a series of identity and expression coefficients generated in creating the facial model to detect a neutral pose. Then, facial action coding system-(FACS)-based expressions may be added to the facial mode by transferring those expressions from a generic face.

The model may include multiple blendshapes which define the various characteristics of the model and may incorporate a number of joints that enable movement (e.g. jaw, eye movement, tongue movement, etc.) through FACS-based animation. In this way, a generic set of emotions, and speech animation may be added, quite easily, to a facial model. The generic facial rigging may be updated manually (if desired) later.

The hairstyle digitization 215 system is discussed in more detail below with reference to FIG. 8. Generally, the hairstyle digitization 215 system relies upon characterization of the hairstyle and identification of the closest hairstyle from a large polystrip hairstyle database that most closely resembles the hair region identified by the face and hair segmentation 211 system.

For the hair appearance matching 216 system, the closest hairstyle identified by the hairstyle digitization is morphed through modification of the attributes or one or more polystrips to more closely resemble the hair region segmented by the face and hair segmentation 211 system. Any resulting collisions with the head are corrected. Then, any "patches" of no or limited coverage by the polystrip hairstyle are patched through the addition of one or more additional polystrips to cover the limited coverage region.

Finally, the avatar creation framework 210 combines the real-time three-dimensional avatar 217 before it is output by combining the three-dimensional, textured, facial model with the customized polystrip hairstyle.

Figure 3:
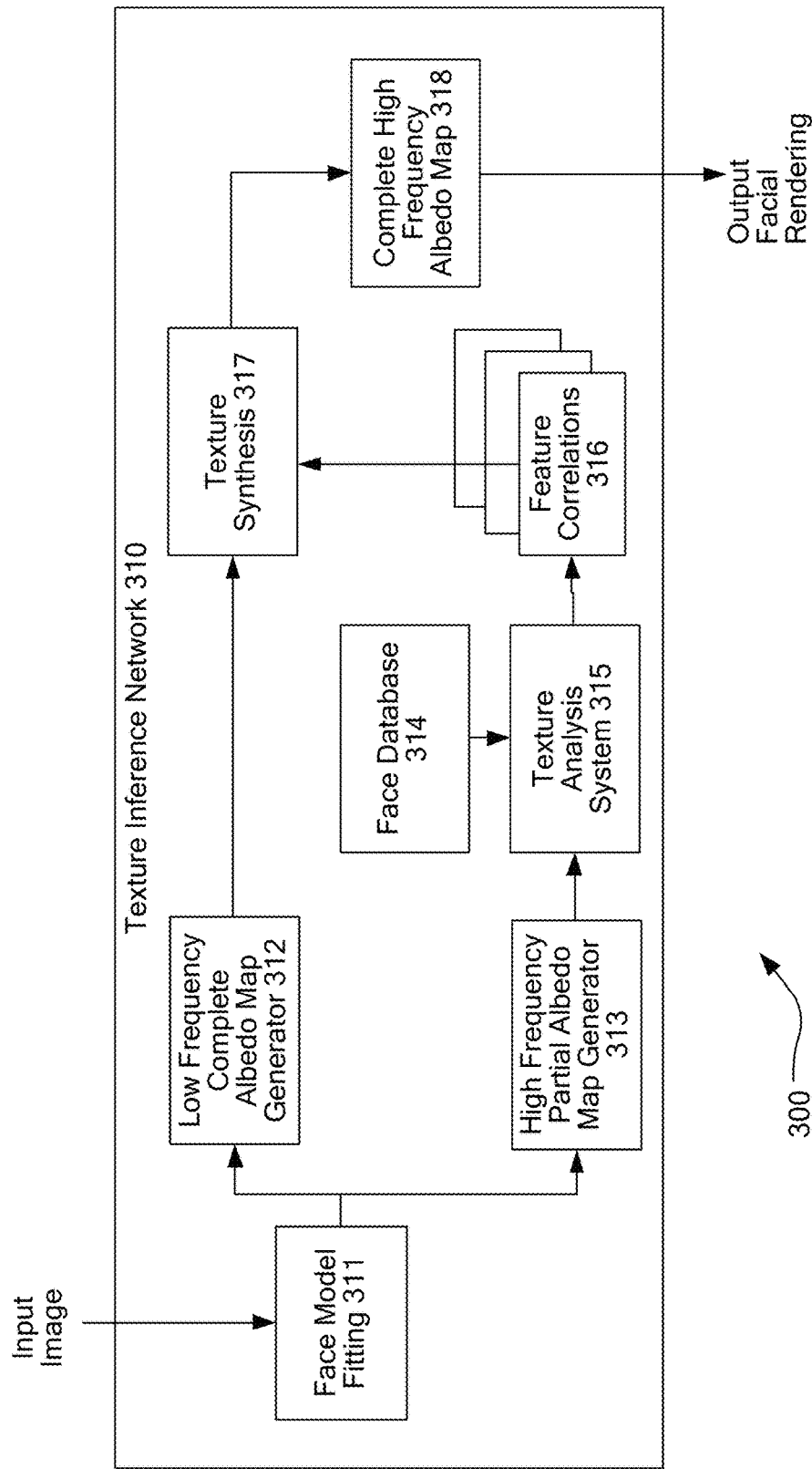
FIG. 3 is a functional diagram of a texture inference network for a system for photorealistic facial texture inference using deep neural networks for avatar digitization.

FIG. 3 is a functional diagram of a texture inference network 310 for a system 300 for photorealistic facial texture inference using deep neural networks. The system 300 receives an input image selected, for example, by a user.

The first function is face model fitting 311. The face model fitting is a system, described in patent application Ser. No. 15/438,551 entitled "Real-Time Facial Segmentation and Performance Capture from RGB Input" owned by the assignee of this patent application, that may be used to generate an overall three-dimensional map of a human face from a single input image. This shape may, preferably, be a three-dimensional model and may be derived using a series of neural networks to best-match the pose, model, shape, and appearance of the input two-dimensional image by segmenting the face into a number of segments, then selecting those that most closely match the overall facial shape from the image.

Next, the low frequency complete albedo map generator 312 and the high frequency partial albedo map generator 313 operate to generate, respectively, a low frequency albedo map of a complete face and a high frequency albedo map of only the portion of the face that is visible in the image.

The low frequency albedo map that is a complete map is used to estimate the entirety of the human face based upon the visible portions of the face from the input image and a neural network that may be used to estimate, based upon the visible portions of the face, the remainder of the human face.

The high frequency albedo map of only the visible portions of the face from the input image is created so that greater detail may be used during texture analysis to most accurately match the input image with images from the training data set.

A face database 314 is also present in the texture inference network 210. The face database 314 is a set of high-resolution facial images including facial texture. The face database 314 preferably includes a set of carefully posed and lighted human faces with three-dimensional data of a resolution sufficient to capture facial textures extracted therefrom. The so-called "Chicago Face Database" was used as a face database 314 in creating the results shown herein.

A texture analysis system 315 is also present in the texture inference network 310. The texture analysis system 315 compares the high-frequency albedo map with the data in the face database 314 in order to find the closest matches (or blends of matches) that correspond to the facial textures of the input image. In reality, no single image will completely match across an entire face for facial textures. However, blendweights for a series of faces from the face database 314 (potentially hundreds of faces combined) may be used to mathematically combine facial textures from multiple faces in such a way that a desired facial texture may be found. This process is performed by the texture analysis system 315.

The resulting blendweights are created as a part of the feature correlations 316 which identify particular facial texture features that are most like those of the high frequency partial albedo map.

The texture synthesis system 317 takes the low frequency complete facial albedo map and combines it with feature correlations determined using the texture analysis system 315 to select features and textures that are most like the input image (in the associated pose and estimated lighting). The texture synthesis system 317 can work to minimize the differences between the calculated facial features and the actual input image, when compared. In this way, an output facial rendering may be created that realistically models the input image while incorporating appropriate facial textures.

Figure 4:
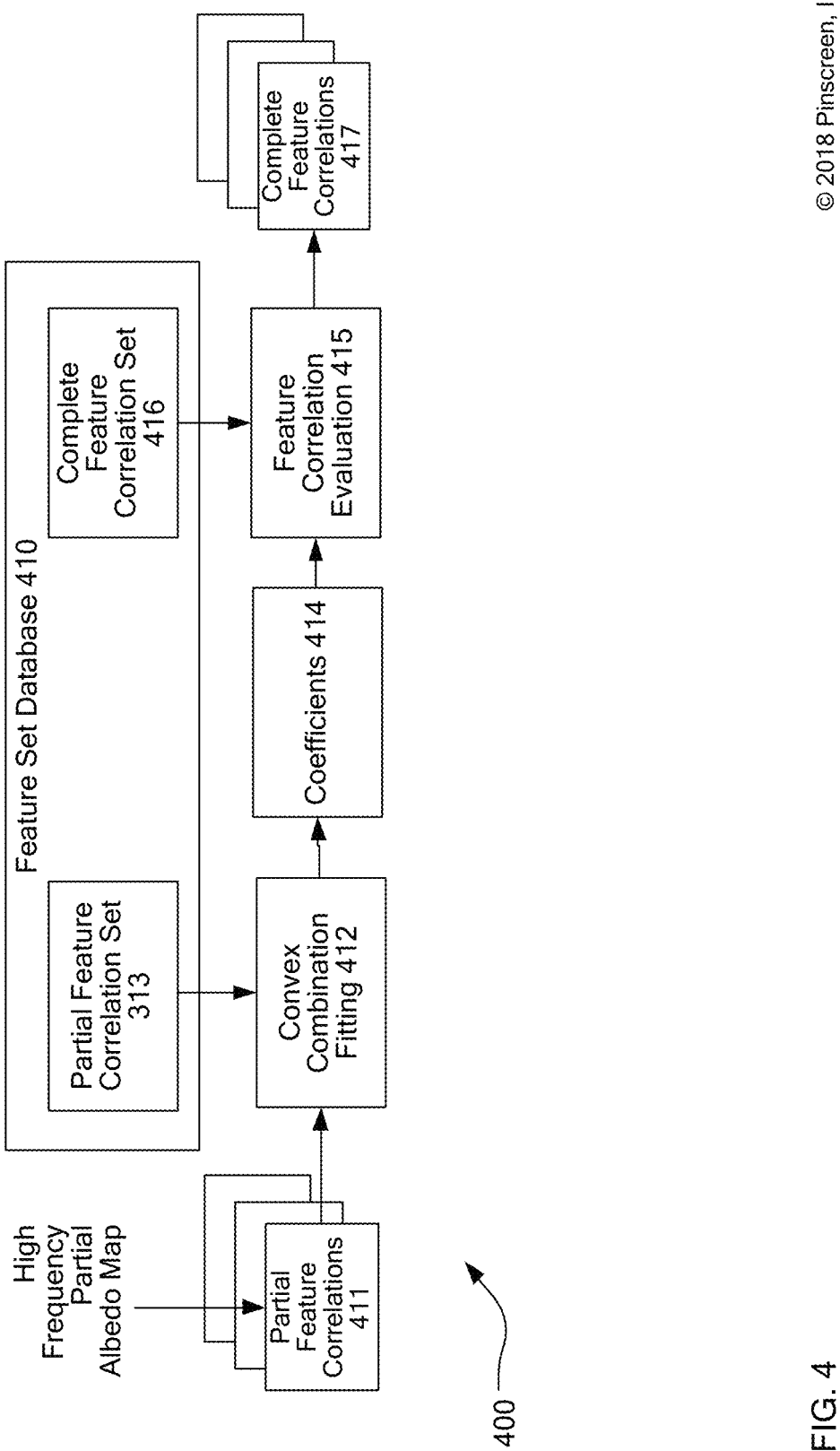
FIG. 4 is a functional diagram of texture analysis system within a system for photorealistic facial texture inference using deep neural networks for avatar digitization.

FIG. 4 is a functional diagram of a texture analysis system 400 within a system for photorealistic facial texture inference using deep neural networks. This system is used to identify the set of facial texture features from those within a facial database that most closely matches the input image.

The texture analysis system 400 uses the high frequency partial albedo map that was created from the visible portions of the face in the input image. Several functions are performed by the system 400.

First, partial feature correlations 411 are generated from the map to identify the features (within any number of faces) that appear to correspond most closely with the high frequency albedo map. Once those feature correlations are done, the feature set database 410 may be queried using the partial feature correlations to obtain the partial feature correlation set 413. This set 413 is further narrowed by convex combination fitting 412 to limit the desired features to those most likely to correspond to the input image, particularly for input images of low quality. Without convex constraints (effectively, weeding out the extremes of potential facial textures), low-quality input images can result in facial textures that are unrealistic or overly textured compared to a more likely actual facial texture.

This process enables the system 400 to select coefficients 414 that may be used to select facial textural features. Those coefficients 414 are used by the feature correlation evaluation 415 to query the feature set database 410 for a complete feature correlation set 416, including for areas not visible in the high frequency partial albedo map. The feature correlation evaluation generates complete feature correlations 417 that may be used to generate facial texture for the entire three-dimensional, modeled face.

Figure 8:
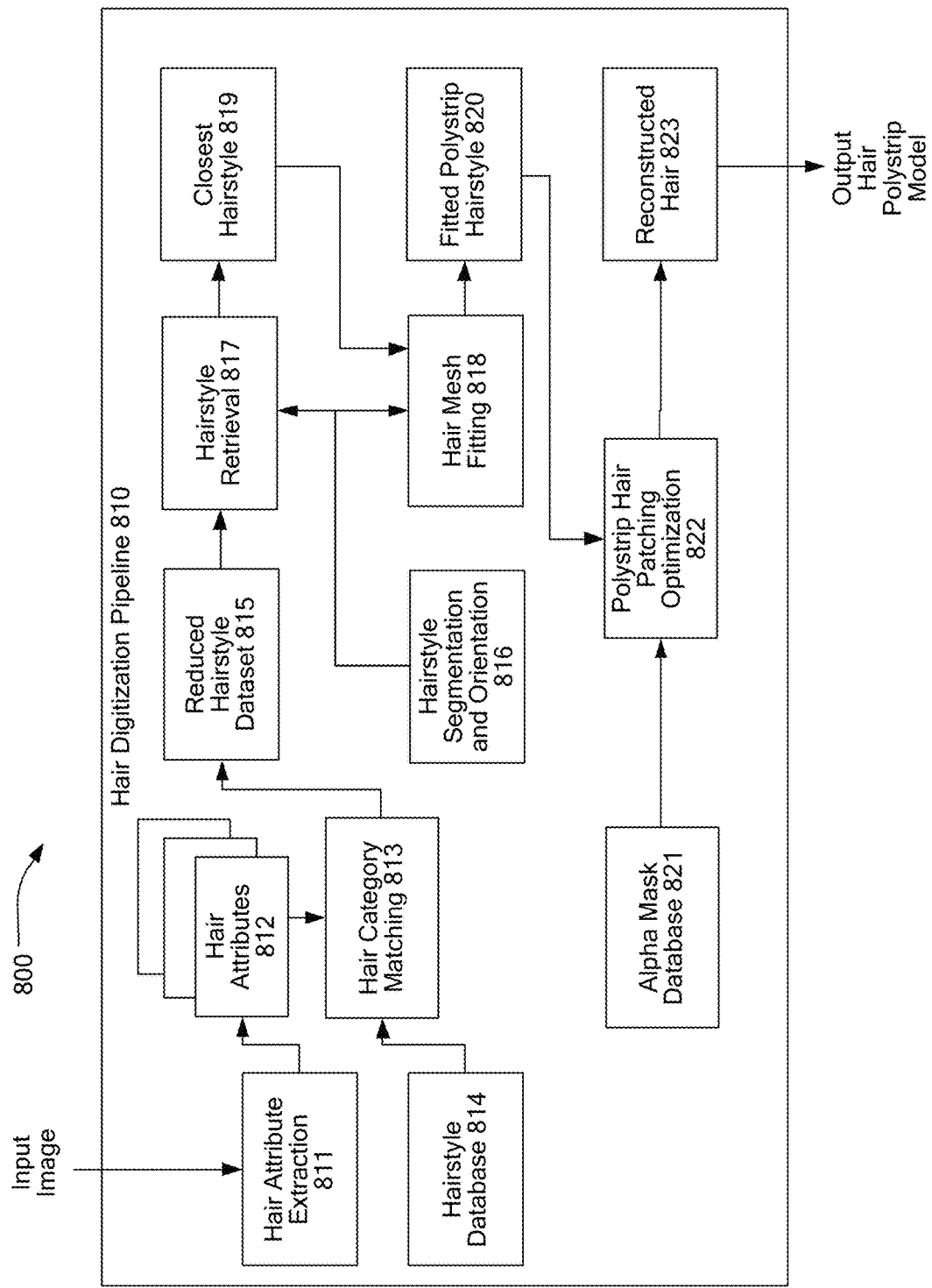
FIG. 8 is a functional diagram of a hair digitization pipeline for a system for avatar digitization.

FIG. 8 is a functional diagram of a hair digitization pipeline for a system for avatar digitization. This is an overall functional diagram of the functions performed that result in an output hair polystrip model that most-closely resembles the hair segment of the input image.

The first function is hair attribute extraction 811. The hair attribute extraction may rely upon a trained neural network which is trained by human-curated data identifying the associated attributes. Then, when the input image is provided to the neural network, the associated attributes are identified. The accuracy of the identifications performed by a test network are shown in the Accuracy column in TABLE 1. It is expected that accuracy would continue to increase over time.

TABLE 1

| Attribute | Possible Values | Accuracy (%) |
|---|---|---|
| hair_length | long/short/bald | 72.5 |
| hair_curve | straight/wavy/curly/kinky | 76.5 |
| hairline | left/right/middle | 87.8 |
| fringe | full/left/right | 91.8 |
| hair_bun | 1 bun/2 buns/. . . n buns | 91.4 |
| ponytail | 1 ponytail/2 ponytails . . . n ponytails | 79.2 |
| spiky_hair | spiky/not spiky | 91.2 |
| shaved_hair | fully/partially shaved | 81.4 |
| baldness | fully bald/receded hair | 79.6 |

Once the hair attributes 812 are extracted, the hair is categorized by the hair category matching 813 using a hairstyle database 814, which may contain hundreds or thousands of three-dimensional polystrip hairstyles. These polystrip hairstyles may be hand-created by three-dimensional artists to correspond to numerous hairstyles. Using the hair attributes 812 identified, the full hairstyle database may be narrowed to a reduced hairstyle dataset 815 of only tens or hundreds of potential hairstyles.

The hairstyle retrieval 817 may then access the hairstyle segmentation and orientation 816 prepared at the outset to separate the hair region from the facial region. As discussed above, the process of identifying facial and hair regions generally corresponds to the process of segmenting facial regions described in the co-pending U.S. patent application Ser. No. 15/438,551 entitled "Real-Time Facial Segmentation and Performance Capture from RGB Input" filed Feb. 21, 2017 by the assignee of this patent. That disclosure discusses segmentation of the face from other non-facial regions, but the same system may be employed to segment hair from other non-hair regions in much the same fashion. The disclosure of that application is incorporated by reference.

Broadly speaking, a neural network is trained by human-curated input images that have been segmented into facial (or in this case, hair) regions. Then, that neural network is provided with the input image. The hairstyle segmentation and orientation 816 is that trained neural network and results in output of a segment of the input image that corresponds to the individual's hair from the image. The neural network is highly accurate, once trained.

The hairstyle retrieval 817 relies upon that segmentation and orientation 816 and quickly compares the shape and attributes to the reduced hairstyle dataset 815 to find the closest hairstyle 819 that is a three-dimensional polystrip hairstyle.

This hairstyle is typically quite close to the actual hairstyle, but further refinement can be made. To make the polystrip hairstyle still closer, hair mesh fitting 818 is used. The polystrips, individually or collectively, are deformed (e.g. lengthened, widened, or thickened) to better correspond to the silhouette of the hair region from the hairstyle segmentation and orientation 816. In this way, the hair polystrips may grow or shrink or otherwise deform to better mirror the actual hairstyle of the individual. This is only possible through the use of polystrips. Individual strands of hair would be difficult, and computationally costly, to deform in this way. Because the number of polystrips is on the order of tens or low hundreds, this deformation may take place relatively quickly. As deformations occur, they may be compared with the hair region from the segmentation and orientation 816 in real-time to iterate toward the most alike.

However, this deformation does occasionally result in occlusions or collisions with the user's head. Simple collision detection may be used to alter some or all of the polystrips so that hair does not pass through avatar ears or head. Those polystrips may be made to lie on top of the avatar's head or ears, or may be shortened or otherwise deformed to avoid collisions. However, the collision detection may cause other deformations to be necessary for the hairstyle polystrips to accurately match the hair region from the hairstyle segmentation and orientation 816. So, the collision detection is integrated into the mesh fitting 818.

Figure 11:
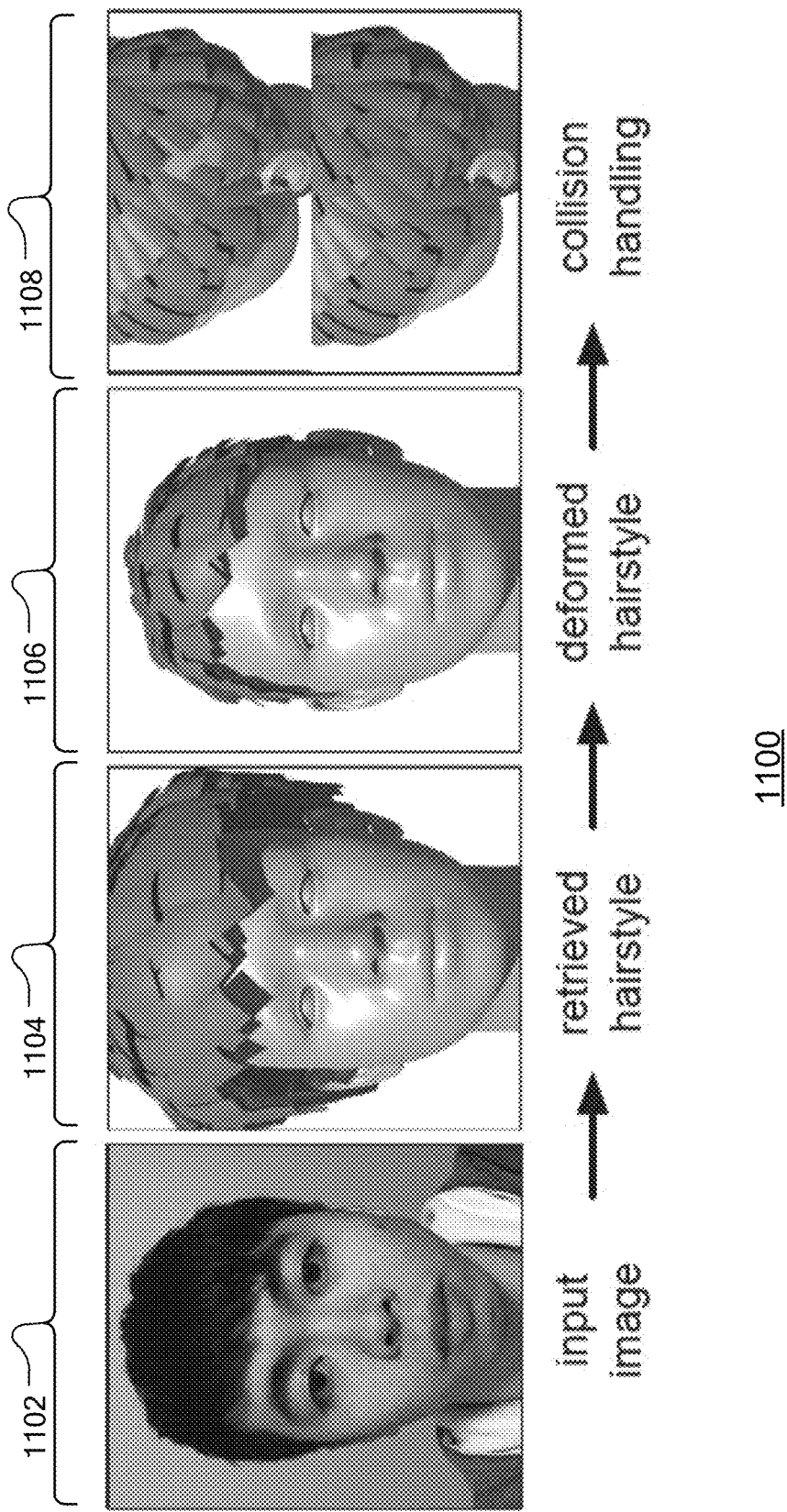
FIG. 11 is an example of a mesh fitting process for selection of a hairstyle in a hair mesh fitting pipeline.

FIG. 11 is an example 1100 of a mesh fitting process for selection of a hairstyle in a hair mesh fitting pipeline. The example 1100 includes an input image 1102. Once the polystrip hairstyle is retrieved at 1104, it is deformed as described above to generate the deformed hairstyle 1106. Then, if collisions are detected, such as the bald spot where the hair polystrips have intersected with the avatar's scalp to create a bald spot in image 1108, then collision handling is used to correct for that bald spot by moving the polystrips outward, away from the scalp. If this causes an unusual shape to the polystrips that does not match the hair region of the input image, then the polystrips may be deformed to compensate.

Returning again to FIG. 8, once the polystrip model is created with the fitted polystrip hairstyle 820, polystrip hair patching optimization 822 ensures that there are no inadvertent "bald" spots or other oddities created through the deformation of the polystrip hairstyle from the database. For example, if a longer hairstyle is the "most like" polystrip hairstyle selected, but the individual's hair is actually short, the hair mesh fitting 818 may shorten the polystrips or narrow them such that bald or uncovered spots appear in the hairstyle. This is inadvertent, and barring something unusual, not typical of most hairstyles.

A texture map is applied to the polystrip model from the alpha mask database 821. The alpha mask database may include a database of numerous hair textures that may be applied to the polystrips to appear like hair. There may be hairstyles for wavy hair, dreadlocks, etc. And, the textures may include alpha blending for some or all of the hair. The polystrip hair patching optimization 822 may detect places where the scalp is visible through a polystrip (if transparency is applied to a portion of that polystrip) or in the absence of a polystrip.

Then, the polystrip hair patching optimization may take an average of the shape, orientation, and texture of two (or more) nearest polystrips to generate a new polystrip that may be placed between them, thereby covering the "bald spot" or other patch.

Figure 12:
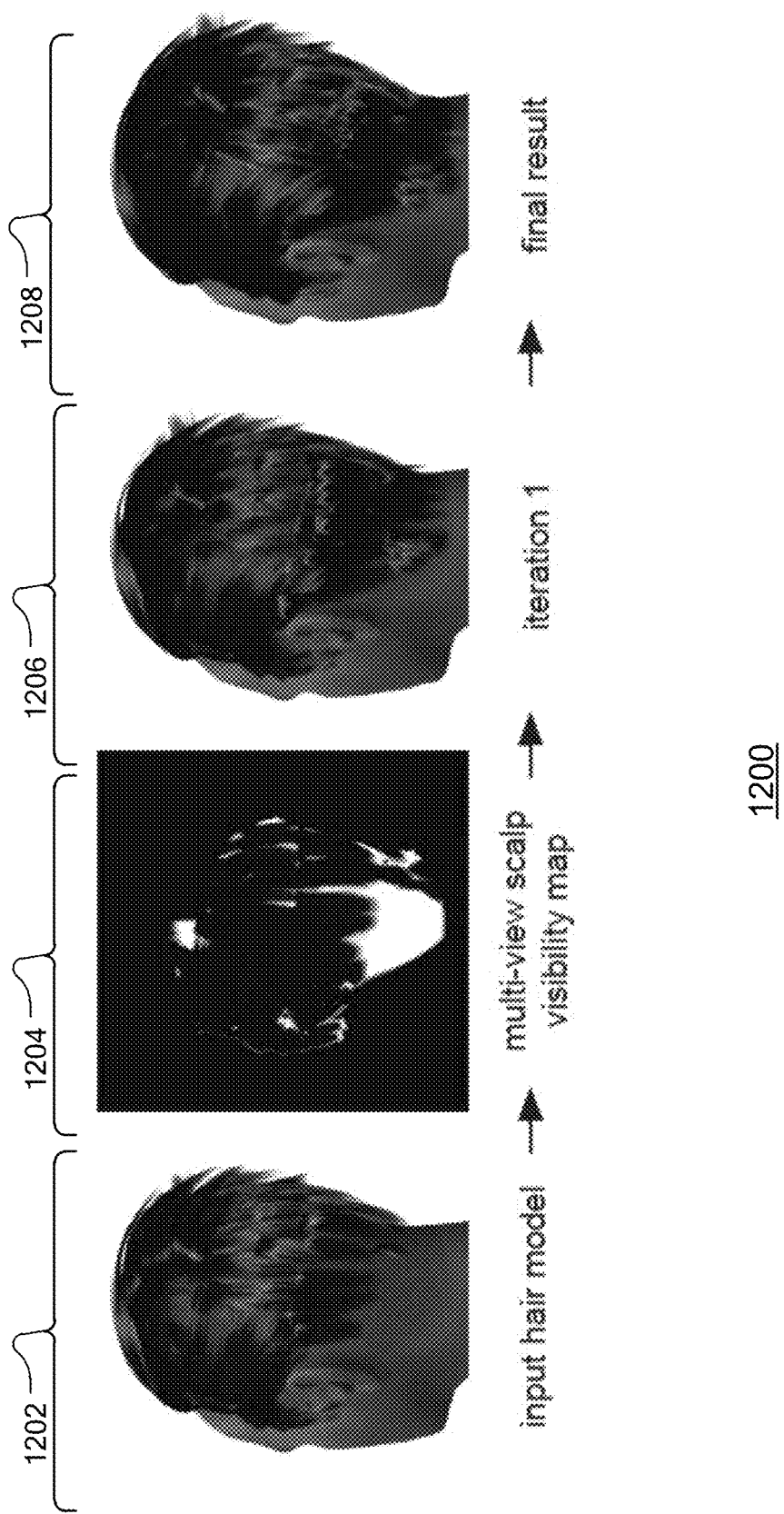
FIG. 12 is an example of a polystrip patching process for hair digitization.

FIG. 12 is an example of a polystrip patching process for hair digitization. The input hair model 1202 is the model created as a result of the operation of the pipeline 800 on the input image up to this point. The model is the current "best fit" for the detected hairstyle. For anything that is not hair, as discussed more fully below, its color is taken to an absolute value of white (or some other, strongly contrasting color) as shown in 1204. In this way, the places where there are "holes" in the polystrips may be more-easily detected. Then, polystrips are iteratively created, e.g. iteration 1 in 1206, to add additional polystrips that are based upon the attributes of two (or more) nearest polystrips to the place being covered. In this way, the covering matches the nearby hair. After several detection and iterations steps, the final result 1208 has no scalp visibility.

Returning to FIG. 8, the result is reconstructed hair 823 which is a deformed, alpha-blended, textured three-dimensional model of the hair from the input image.

Description of Processes

Figure 9:
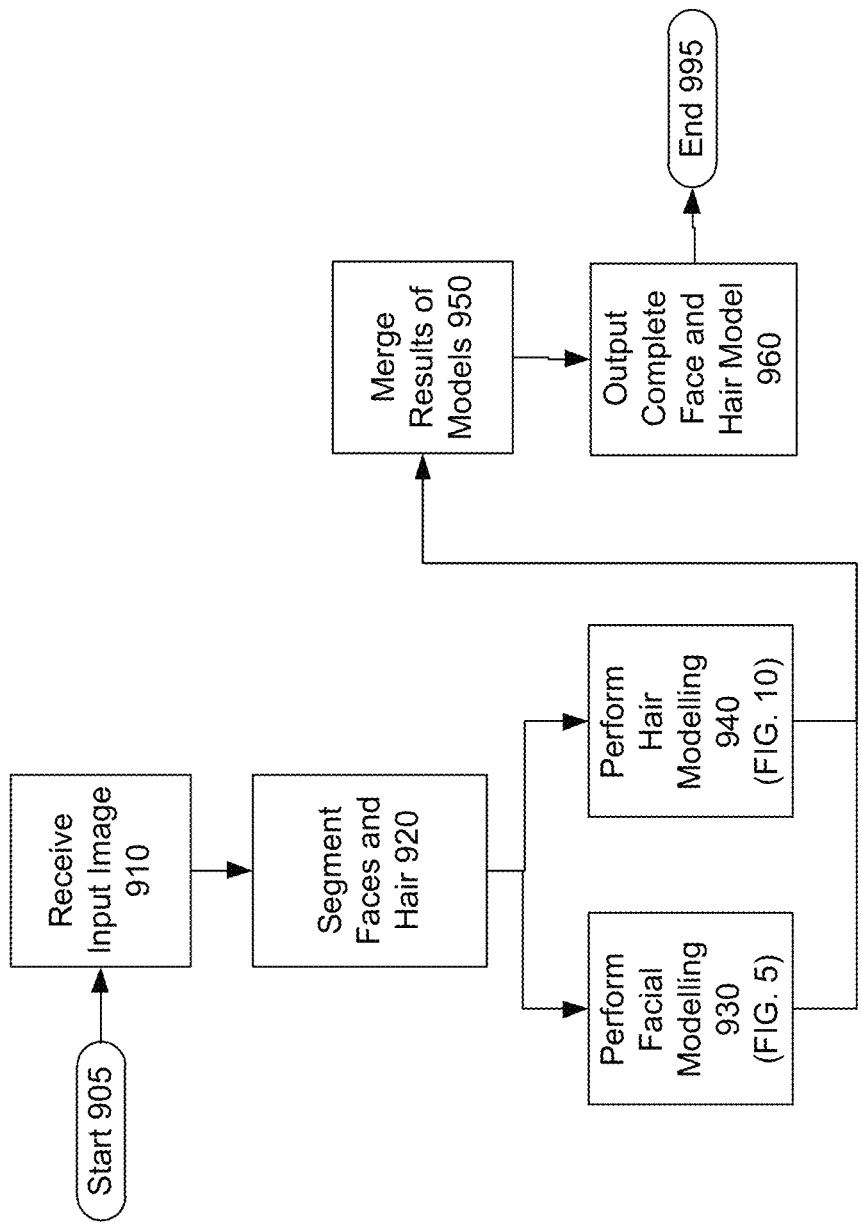
FIG. 9 is a flowchart of a process for avatar digitization using a single input image.

FIG. 9 is a flowchart of a process for avatar digitization using a single input image. The process has a start 905 and an end 995 but may take place many times for one or more input images.

The first step in the process is to receive an input image 910. The input image may be virtually any conventional two-dimensional image of various resolutions. The system will attempt to match the characteristics of the input image regardless of its quality.

Before the three-dimensional avatar is created, the faces and hair are segmented at 920, meaning that the facial regions and hair regions are determined as distinct from one another and bounded within the image (e.g. not part of an individual's neck, not an occluding article like a cup or hand in front of the hair or face, and not a part of the background). This process is described in detail in co-pending U.S. patent application Ser. No. 15/438,551 entitled "Real-Time Facial Segmentation and Performance Capture from RGB Input" filed Feb. 21, 2017 by the assignee of this patent.

Independent trained deep neural networks may be used to detect face regions and hair regions. Or, in some cases, a single neural network may be trained on both facial and hair data in individual images. In such cases, a single neural network may identify both facial and hair regions in input images. The result of this identification is a silhouette of the facial region and of the hair region from the received input image. The silhouette may also incorporate data as to which portions of the hair and facial regions the neural network believes most confidently (e.g. a confidence score) are the respective facial or hair regions. This may be available as a "heat map" or merely as a pixel-by-pixel dataset indicative of a confidence score for each pixel of that silhouette.

Next, the facial region and entire input image are provided to the texture inference network 310 (FIG. 3) at 930 to generate a textured facial map as described below with reference to FIG. 5. Substantially simultaneously, the hair region (and entire input image) are provided to the hair digitization pipeline 810 (FIG. 9) to generate a polystrip hair model at 940 as described in FIG. 10.

Thereafter, the results of the two processes are merged at 950. The three-dimensional model of the face, including the texture map, is joined to the polystrip hair model to generate a FACS posable three-dimensional facial model.

That model may then be output at 960, for example for use in an AR or VR application, for digital avatar representation for use in telepresence-type conferencing applications or in video game or other three-dimensional environmental experiences or games.

The process then ends at 995.

Figure 5:
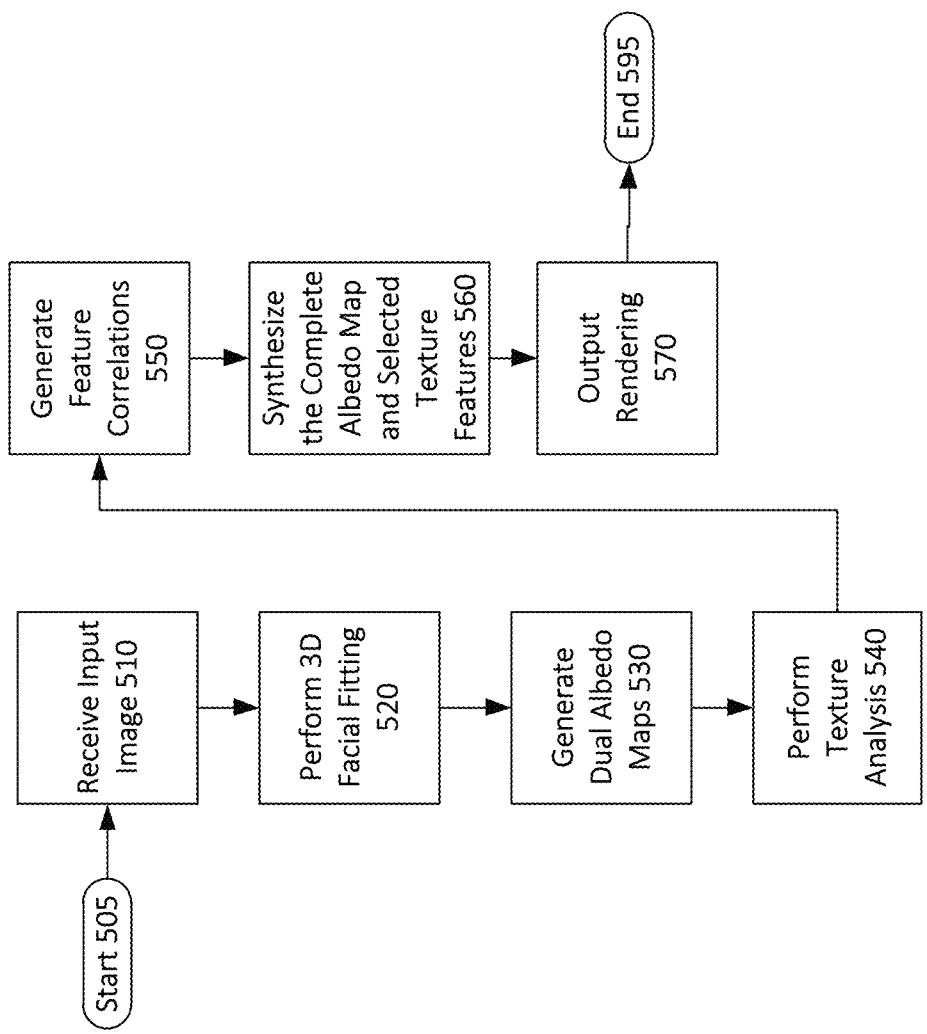
FIG. 5 is a flowchart of a process for photorealistic facial texture inference using deep neural networks for avatar digitization.

FIG. 5 is a flowchart of a process for photorealistic facial texture inference using deep neural networks. The flowchart has a start 505 and an end 595 that take place for each input image. Multiple images may be input, if available, and the results may be merged in any number of ways, but the process works well with even a single image as input.

First, an input image is received at 510. As indicated above, the input image may be virtually any conventional two-dimensional image of various resolutions. The system will attempt to match the characteristics of the input image regardless of its quality.

Following receipt of the input image, three-dimensional facial fitting is performed at 520. To fit the image to a facial model, a face shape V, an albedo map I, the rigid head pose (R, t), and the perspective transformation $\Pi_P$ (V) with the camera parameters P are computed. This is done using a principal component analysis (PCA) model fitting technique. The low-frequency facial albedo I and the shape V are represented as a multi-linear PCA model with n=53 k vertices and 106 k faces as follows:

$$V(\alpha_{id}, \alpha_{exp}) = \overline{V} + A_{id}\alpha_{id} + A_{exp}\alpha_{exp},$$

$$I(\alpha_{al}) = \overline{I} + A_{al}\alpha_{al},$$

Where the identity, expression, and albedo are represented as a multivariate normal distribution with the corresponding basis: $A_{id} \in R^{3n \times 80}$, $A_{exp} \in R^{3n \times 29}$, and $A_{al} \in R^{3n \times 80}$, the mean $\overline{V} = V_{id} + V_{exp} \in R^{3n}$, and $\overline{I} \in R^{3n}$, and the corresponding standard deviation $\sigma_{exp} \in R^{29}$, and $\sigma_{al} \sigma R^{80}$. One may use Lambertian surface reflectance and model the illumination of the face using second order Spherical Harmonics, denoting the illumination $L \in R^{27}$. A Basel Face Model dataset may be used for $A_{id}$, $A_{al}$, $\overline{V}$, and $\overline{I}$, and FaceWarehouse for $A_{exp}$. All unknowns may be computed $\chi = \{V, I, R, t, P, L\}$ with the objective function:

$$E(\chi) = w_c E_c(\chi) + w_{lan} E_{lan}(\chi) + w_{reg} E_{reg}(\chi),$$

with energy term weights $w_c = 1$, $w_{lan} = 10$, and $w_{reg} = 2.5 \times 10^{-5}$. The $E_c$ term minimizes the distance between the synthetic face and the input image and the landmark term $E_{lan}$ minimizes the distance between the facial features of the shape and the detected landmarks, and the regularization terms penalize the deviation of the fade from the normal distribution. This results in the synthetic face generally being forced to appear more like a typical face than some unusual face.

The $E_c$ term may be augmented with a visibility component:

$$E_c(\chi) = \frac{1}{|M|} \sum \| C_{input}(p) - C_{synth}(p) \|_2,$$

where $C_{input}$ is the input image, $C_{synth}$ is the synthesized image, and $p \in M$ is a visibility pixel computed from a semantical facial segmentation estimated using a two-stream deep neural network. The segmentation mask ensures that the objective function is computed with valid face pixels for more robust operation in occluded situations (e.g. hair, hands, or other objects covering portions of the face). The landmark fitting term $E_{lan}$ and the regularization term $E_{reg}$ are defined as:

$$E_{lan}(\chi) = \frac{1}{|\mathcal{F}|} \sum_{i \in \mathcal{F}} \| f_i - \Pi_P(RV_i + t) \|_2^2,$$

$$E_{reg}(\chi) = \sum_{i=1}^{80} \left[ \left(\frac{\alpha_{id,i}}{\sigma_{id,i}}\right)^2 + \left(\frac{\alpha_{al,i}}{\sigma_{al,i}}\right)^2 \right] + \sum_{i=1}^{29} \left(\frac{\alpha_{exp,i}}{\sigma_{exp,i}}\right)^2.$$

where $f_i \in F$ is a two-dimensional facial feature obtained from a method introduced by V. Kazemi and J. Sullivan in "One millisecond face alignment with ensemble regression trees" introduced in IEEE CVPR in 2014. The objective function may then be optimized using a Gauss-Newton solver based on iteratively reweighted least squares with three levels of pyramids. It has been observed that under this method, the optimization converges with 30, 10, and 3 Gauss-Newton steps from the coarsest level to the finest.

This process results in a complete map of the face, including regions not visible within the input image by mapping segmented regions of the face to the most likely three-dimensional model for each segment, then combining each of the segments into an entire face. However, the resulting map is of low frequency.

This low frequency, full-face map is generated at 530, with a high-frequency map generated by simply removing the shading component from the input RGB image itself. This may be done by estimating the illumination L, the surface normal N, and optimizing the partial face geometry V generated above. The same facial segmentation technique may then be used for the low frequency albedo map to extract a partial high frequency albedo map for the visible portions of the face from the input image.

Next, texture analysis is performed at 540. This process seeks to analyze the input image using a deep neural network trained with a large data set of facial textures to select the facial texture that is most like that shown in the input image.

The feature correlations are generated at 550. This generation does not actually match the actual texture from the image. Instead, it is an existing facial texture, or combination of facial textures generated by the neural network, that most-closely resembles that of the image. In this way, the actual attributes are not actually recreated, but instead an as-close-as-possible simulation is created instead.

The complete albedo map and texture features are synthesized with the three-dimensional facial model created at 520 to generate a textured facial model at 560. The resulting combination may be output as a rendering at 570.

The process then ends at 595.

Figure 6:
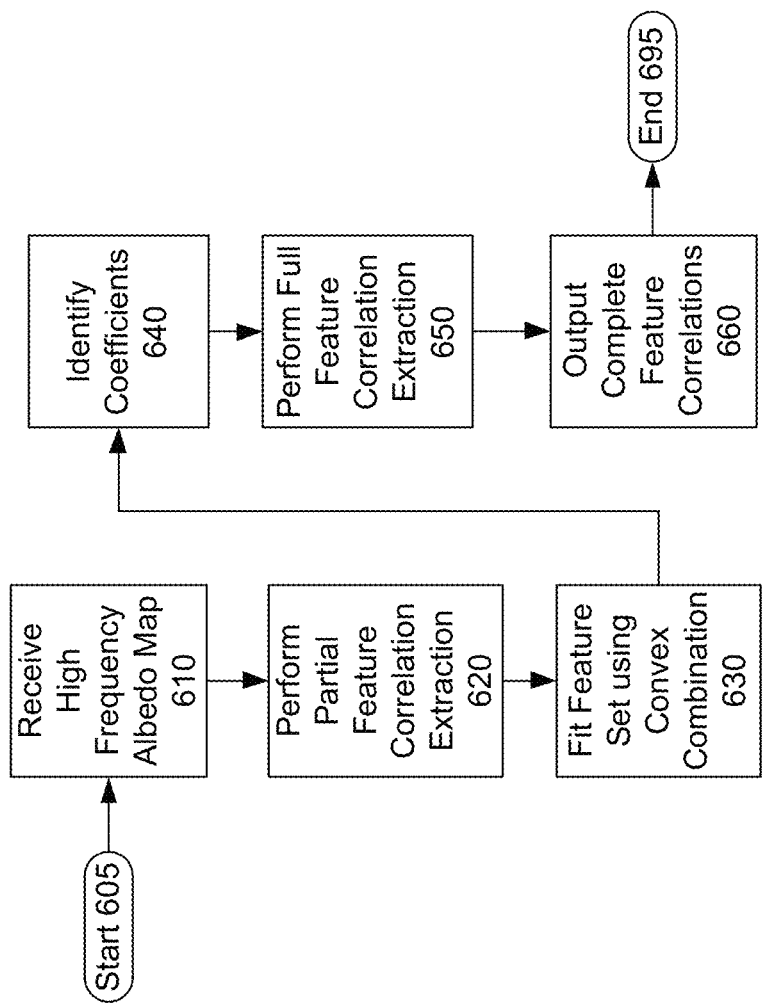
FIG. 6 is a flowchart of a process for texture analysis in a system for photorealistic facial texture inference using deep neural networks for avatar digitization.

Turning now to FIG. 6 for a more detailed description of texture analysis. FIG. 6 is a flowchart of a process for texture analysis in a system for photorealistic facial texture inference using deep neural networks. FIG. 6 has a start 605 and an end 695, and may take place for every input image.

In general, texture analysis identifies features in the input image that correlate with features in a face database of high-resolution texture maps. In particular, many faces, tens, hundreds, or thousands, may be blended through correlation to those faces in various weightings or blends to create a composite set of facial texture features that most closely match the input image. Once the correlation matrices are identified, blendweights may be selected to make the differences between the input image and a corresponding facial texture as small as possible (thereby making the images most alike).

First, the high frequency partial albedo map is received at 610. This map does not include the entirety of the face estimated, but includes only actually visible portions of the face from the input image.

Based upon the high frequency partial albedo map, partial feature correlation extractions 620 are performed by a neural network trained with a large dataset of high-resolution texture maps of faces at 620. So, for an input image I, let $F^l|(I)$ be the filter response of I on layer l. $Fl(I) \in R^{Nl \times Ml}$ where $N_l$ is the number of channels/filters and $M_l$ is the number of channels (width×height) of the feature map. In such a case, the correlation of local structures can be represented as the normalized Gramian matrix $G^l(I)$:

$$G^l(I) = \frac{1}{M_l} F^l(I) \, (F^l(I))^T \in R^{N_l \times N_l}$$

For a given face texture, its feature response from the latter layers and the correlation matrices from former layers sufficiently characterize the facial details to ensure photorealism and can create perceptually identical images. As a result, a complete and photorealistic facial texture can be inferred from this information using the partially visible face in an input image $I_0$.

Only the low frequency appearance is encoded in the last few layers, so feature response from the complete low frequency albedo map $I(\alpha_{al})$ optimized above provides an estimation of the desired feature response $\hat{F}$ for $(I_0)$:

$$\hat{F}^l(I_0) = F^l(I(\alpha_{al}))$$

Thereafter, feature correlations for the entire face may be extracted.

Correlation matrices from images of different faces may be linearly blended, and, when blended, the combined matrices continue to produce photorealistic results. Similarly, the desired correlation matrix can be linearly combined from a series of such matrices in a large facial texture database. The partially visible face does impose a limitation on direct linear blending because portions of the high frequency albedo map generated based upon the input image $I_0$ will contain no data.

To compensate for this shortcoming of the input images, the portions of the complete textures in the facial texture database that are not visible in the input image are masked out when performing feature extraction. To do this, a mask-out function is defined as M(I) to remove pixels in the facial database textures that are non-visible in the input image as:

$$\mathcal{M}(I)_p = \begin{cases} 0.5, & \text{if } p \text{ is non-visible} \\ I_p, & \text{otherwise} \end{cases}$$

where p is an arbitrary pixel. 0.5 is used as a constant intensity for non-visible regions of the facial textures, so that such regions may be readily identified. As a result, the new correlation matrix for layer 1 for each image in dataset $\{I_1, \ldots, I_K\}$ is:

$$G^l_{\mathcal{M}}(I_k) = G^l(\mathcal{M}(I_k)), \forall k \in \{1, \ldots, K\}$$

The resulting correlation matrices $\{G^l_{\mathcal{M}}(I_k), k=1, \ldots, K\}$ derived above from the facial texture database, the optimal blending weight to linearly combine them so as to minimize the difference from $G^l_{\mathcal{M}}(I_0)$ from input $I_0$ is:

$$\min_w \Sigma_l \| \Sigma_k w_k G^l_{\mathcal{M}}(I_k) - G^l_{\mathcal{M}}(I_0) \|_F$$

$$\text{s.t.} \sum_{k=1}^{K} w_k = 1$$

$$w_k \geq 0 \ \forall k \in \{1, \ldots, K\}$$

Frobenius norms of correlation matrix differences on different layers are accumulated. Extra constraints are added to the blending weight so that the blended correlation matrix is located within the convex hull of matrices derived from the database. This is used to fit feature set at 630. Other alternatives are available, such as least squares optimization without constraints, artifacts sometimes occur for portions of the input image that are of particularly poor quality. Forcing the blend weights away from the edge cases causes the resulting image to move toward a "typical" image and away from unusual ones thereby reducing artifacts almost completely.

The coefficients are identified at 640 by accumulation.

Now, the full feature correlation extraction may take place at 650 by computing the correlation matrix for the entire image:

$$\hat{G}^l(I_0) = \sum_k w_k G^l(I_k), \forall l$$

The result is an output of the complete feature correlations at 660 for use in textual synthesis. The textural analysis ends at 695.

Returning to FIG. 5, the feature correlations are identified in the feature correlation matrix at 550 as described above.

Once the appropriate feature correlation matrix has been created, the estimated facial textures for an entire face based upon the input image may be generated by applying the textures, based upon the correlation matrix, to the complete albedo map at 560. This is a combination of the feature response $\hat{F}$ and the full feature correlation $\hat{G}$ based upon $I_0$, the complete albedo map I that best matches both will be the best fit for a matching facial texture. Specifically, a set of high frequency preserving layers $L_G$ and low frequency preserving layers $L_F$ are selected with an effort to match $\hat{G}^l(I_0)$ and $\hat{F}^l(I_0)$ for layers in these sets, respectively.

The desired albedo map for the entire face is computed by optimizing:

$$\min_I \sum_{l \in L_F} \| F^l(I) - \hat{f}^l(I_0) \|_F^2 + \alpha \sum_{l \in L_G} \| G^l(I) - \hat{G}^l(I_0) \|_F^2$$

where $\alpha$ is a weight balancing the effect of high and low frequency details. If $\alpha$ is set to a large number (e.g. 2000), then more details are preserved than if set to a low number (e.g. 2). So, if detail in the resulting three dimensional facial textures is preferred, higher $\alpha$ are used.

This optimization problem is non-convex, but the gradient of $G^l(I)$ can be computed easily because it may be considered an extra layer of the neural network after layer 1. The optimization is similar to the training process of a neural network with Frobenius norm as its loss function. Notably, the function is not solved for its network parameters. Instead, the input I is altered so as to minimize the differences between I and $I_0$. As should be appreciated, this results in the generated facial textures that most correspond to those of the input image.

For the Frobenius loss function:

$$\mathcal{L}(X) = \|X - A\|_F^2$$

where A is a constant matrix, and for Gramian matrix $G(X) = XX^T/n$, their gradients may be computed analytically as:

$$\frac{\partial \mathcal{L}}{\partial X} = 2(X - A) \quad \frac{\partial G}{\partial X} = \frac{2}{n} X$$

The derivative of every high frequency $L_d$ and low frequency $L_c$ can be computed, so the chain rule may be applied to this multi-layer neural network to back propagate the gradient on preceding layers all the way to a first layer. In this way, the gradient of input is $\nabla I$. Due to the number of variables and computer limitations (e.g. GPU memory), an L-BFGS solver may best optimize I. The low frequency albedo $I(\alpha_{al})$ may be used to initialize the problem.

Once the problem is optimized, the rendering may be output at 570 showing the high resolution, three-dimensional image incorporating the best-fit facial texture based upon the neural network trained facial database. The process for photorealistic facial texture inference using deep neural networks ends at 595.

Figure 7:
FIG. 7 is a series of examples of input images and the resulting facial textures and albedo maps generated by a system for photorealistic facial texture inference using deep neural networks for avatar digitization.

FIG. 7 is a series 700 of examples of input images and the resulting facial textures and albedo maps generated by a system for photorealistic facial texture inference using deep neural networks. A series of individuals, 704, 706, 708, 710, and 712 are shown in rows, while the input image is shown in column 702, low frequency albedo map and the high frequency albedo maps are shown in columns 702' and 702", respectively. These two columns may be viewed as intermediate steps along the way to a completed rendering in column 702'''. Closeup images of the completed rendering are shown in columns 702'''' and 702'''''.

As can be seen, the three-dimensional renderings are convincing, but more importantly, the facial textures are likewise convincing. The method generates photorealistic results from a single input image across various facial structures, from faces in different poses, and for a wide array of skin and facial tones and textures.

Figure 10:
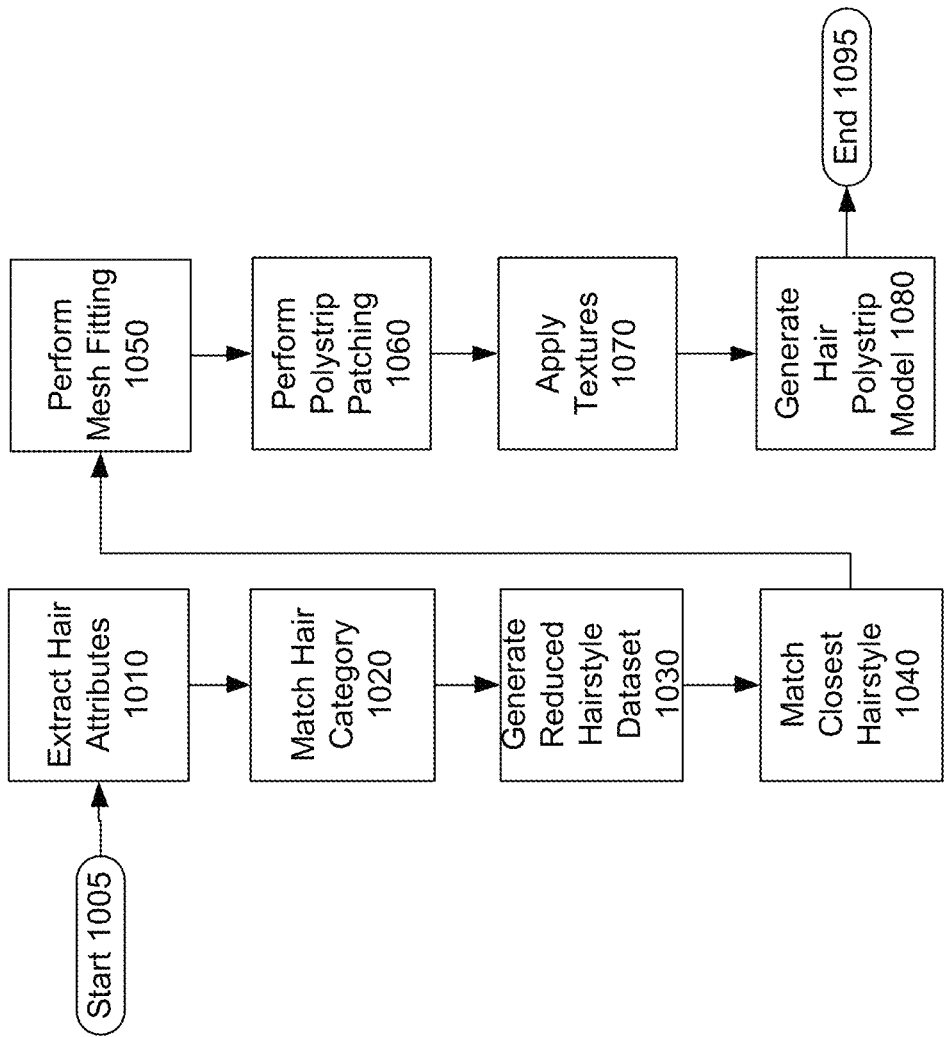
FIG. 10 is a flowchart of a process for hair digitization.

FIG. 10 is a flowchart of a process for hair digitization. The process has a start 1005 and an end 1095, and may repeat many times for any number of input images.

After the start 1005, hair attributes may be extracted at 1010 from the input image. Notably, the entire image is used, but the image may have been previously segmented (see FIG. 9) into hair regions and facial regions. To perform this attribute extraction, reference is made to a large hairstyle database. One example of such a database is the publicly available USC-HairSalon database of three-dimensional hairstyles. As embodied by this application, this database was augmented with an additional 89 hairstyle models which are aligned, at a neutral pose, to a PCA (principal component analysis) mean head model. The USC-HairSalon database was further enhanced by combinatorial processes to create still other, alternative hairstyles. This has the benefit in the present disclosure of enabling pre-deformation models that may be more-closely related to input images in some cases.

To further extend the number of potential hairstyle models in this process, the available models are clustered into five groups using a k-means clustering based upon the root positions and the strand shapes. Then, for every pair of hairstyle models, one polystrip is selected from near the center of each model. The additional polystrips are extrapolated from these two polystrips using a volumetric combination model. The database may further be augmented by flipping each hairstyle along an x-axis (when viewing the hairstyle from the front, center of the face). The resulting augmented hairstyle database used herein included a total of 100,000 hairstyles.

The hairstyles are formed as polystrips, as discussed above, which are thin strips capable of having a texture (e.g. RBG texture or bitmap) applied and which may be partially transparent (e.g. include alpha regions). As a result, each polystrip interacts with the scalp and other polystrips in a way that mimics the reaction of real hair with three-dimensional objects, and incorporates sufficient transparency to allow other hair to appear below it (other polystrips). However, the physics of the polystrip correspond roughly to typical physics associated with strands of hair in groups. The textures provide still more realism. Further, polystrips are computationally easier to render than many individual strands of hair.

To generate a polystrip model that accurately reflects a given hairstyle, short polystrips may be grouped. This may be accomplished by selecting the longest hair strand in a given hairstyle, then expanding that strand to cover the shorter nearby strands. The shorter, covered strands may be removed as unnecessary (computationally and visually) and continue the process throughout a hairstyle. As a result, an efficient model that matches a given three-dimensional hairstyle may be achieved.

An image set, for example CelebA with various hairstyles and labelled hair attributes, may be used. Also, the models created in this dataset are manually labeled with hair attributes (seen in TABLE 1, above). The models may be altered to ensure that there is a relatively even distribution of each label in the database. Then, the manual annotations to the images and three-dimensional models are provided to a classification network for training purposes. A recent test environment used by the inventors relied upon a 50-layer ResNet pre-trained with ImageNet which was fine-tuned using the training database under learning rate $10^{-4}$, weight decay $10^{-4}$, momentum 0.9, batch size 32, and 90 epochs using the stochastic gradient descent method. The images may be augmented using various perturbations such as brightness, contrast, and saturation. The images may be resized for uniformity at training time and when making predictions after training.

The hairstyle database is further augmented thereafter by pre-rendering a two-dimensional mask of reach hairstyle as thumbnails from 35 different perspectives (e.g. face-first, side, lower side, above, etc.). These perspectives are intended to enable robustness of the silhouette matching that will take place later. In cases in which the hair is cropped or occluded, the hairstyle classifiers (e.g. the attributes such as short, kinky, etc.) may provide the most accurate similarities.

When running, the hair attributes may be detected using the trained neural network, such that the most likely hairstyles from the polystrip hairstyle database are identified. These may be the k-closest matching hairstyle models with the smallest Euclidian distance in the descriptor space. If the head is bald, the hairstyle identification may be skipped entirely.

A large database of three-dimensional polystrip hairstyles that have been labeled with various attributes of the associated hairstyle such as those shown in TABLE 1 is used for characterizing the hairstyle of an input image in order to identify a subset of hairstyles for comparison. Using the identified attributes, the k-closest matching hairstyles are identified at 1020. The number of attribute matches may be in the tens or hundreds. This is the reduced hairstyle dataset generated at 1030.

Using that reduced hairstyle dataset, the closest hairstyle match may be found at 1040. This may be performed by comparing the thumbnails generated for each of the reduced hairstyle dataset to the input image silhouette of the hair region. The most-alike silhouette is selected as that associated with the most-alike three-dimensional hairstyle model.

Once the most-alike hairstyle model is selected, the model is deformed using hair mesh fitting at 1050. To perform this step, the hair fitting algorithm first deforms the polystrip hairstyle model to better fit the personalized head model. This may be done rigidly, on purpose, to ensure that the hair is as tightly-oriented as possible to the head model. This may be done by representing the displacement of each vertex of the hair mesh of k-nearest vertices on the head mesh using the following inversely weighted Gaussian approximation:

$$dp_i = \sum_{j \in N_i} (1 + \| p_i - q_j \|_2 + \| p_i - q_j \|_2^2)^{-1} dq_j,$$

where p and q are vertices on the hair and mean head mesh respectively. This allows the hair model to follow the shape of the head without intersecting the scalp, thus aligning the hair model to the scalp. Next, a smooth warping function W(•) is used to map vertices of the three-dimensional model of the hairstyle and head to the closest points on the input image two-dimensional silhouette from the camera angle of the input image and then to deform each polystrip using an as-rigid-as-possible warping function shown.

The deformations used, however, can result in a lack of scalp coverage in some areas of the three-dimensional hair polystrip model. To address this issue, additional polystrips may be added using polystrip patching at 1060. To first test for scalp visibility, the absolute difference between the alpha map with and without transparency from multiple viewpoints is tested. If the color remains the same with full transparency as without any transparency, then that represents a lack of coverage. Regions with high exposure are identified for coverage by additional polystrip(s). In the test case, with alpha ranges [0,1], if the difference exceeds 0.5, then blob detection is applied and the blob with the highest error is identified for a new polystrip.

To generate a new polystrip for that location on the hairstyle model, the k-closest polystrips are resampled to average their shapes and orientations. By using the average, this ensures that curvature and length are both accurate to the region, not adding unusual shapes to the silhouette. This process is iterated until there are no differences exceeding 0.5 alpha.

A texture (e.g. bitmap) is applied to each polystrip at 1070 including an alpha mask to enable transparency of some portions of each polystrip and to cause the appearance of "hair" rather than a series of three-dimensional polystrips. The application of textures relies upon the classification network to determine shader parameters such as width and intensity of any primary and secondary highlights. The textures are also diffused and alpha blended between polystrips using an order-independent transparency (OIT) algorithm based upon depth peeling.

The classification network for the hairstyles recommends a most-alike local hairstyle texture for each polystrip. The textures themselves may be created by an artist and pre-categorized to correspond to the classification network in the hairstyle database. Multiple lengths and sizes may be used for various polystrips to increase natural likeness.

Thereafter, the hair polystrip model is generated at 1080. Alpha blending may be used to ensure texture uniformity and natural appearance when applied to the polystrips. The hairstyle may then be applied to the associated three-dimensional model (see FIGS. 2 & 9).

The process then ends at 1095.

Figure 13:
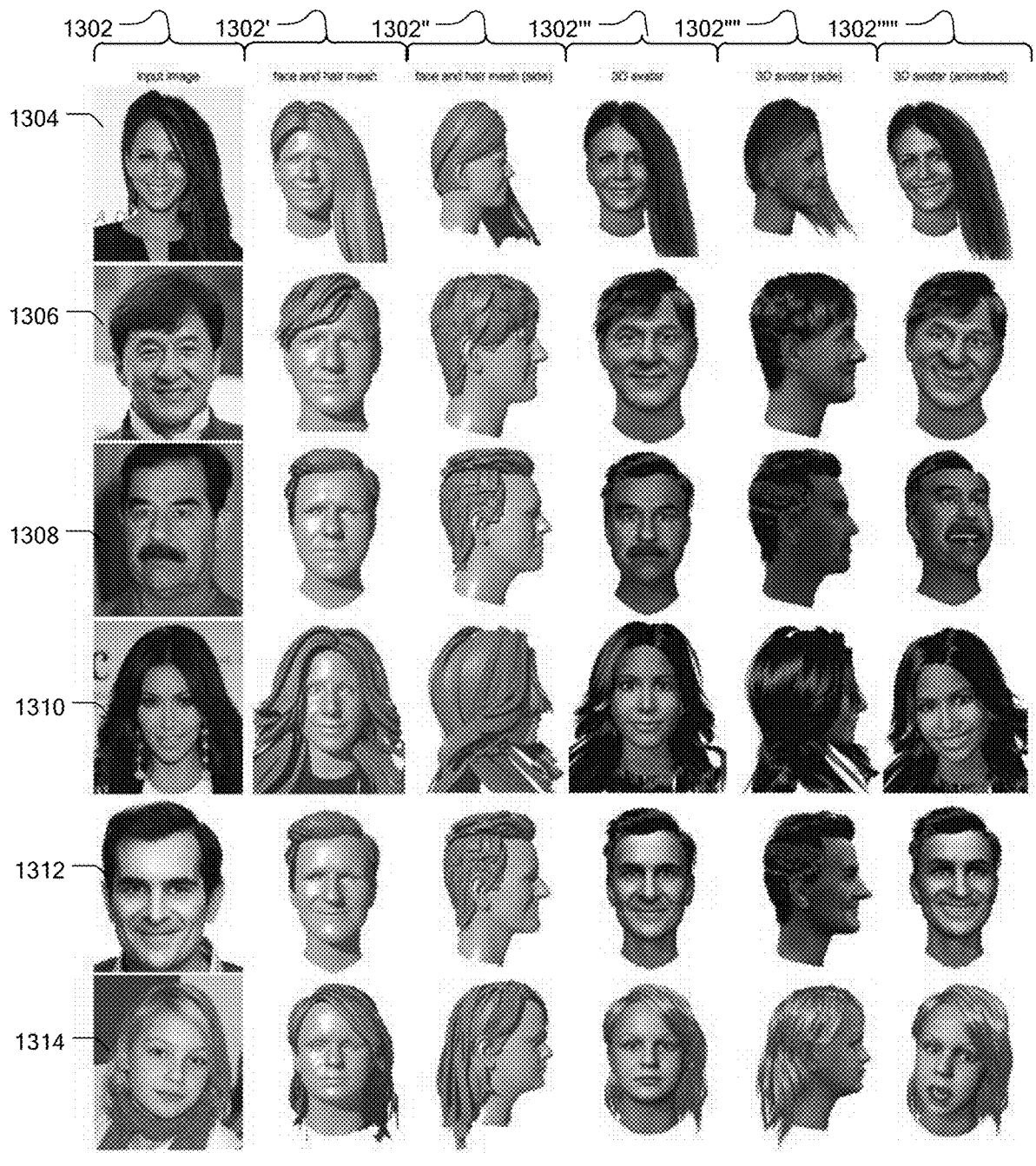
FIG. 13 is a series of examples of input images and the resulting three-dimensional avatar including both a high resolution three-dimensional facial texture and a polystrip hairstyle.

FIG. 13 is a series of examples of input images and the resulting three-dimensional avatar including both a high resolution three-dimensional facial texture and a polystrip hairstyle. A series of individuals 1304, 1306, 1308, 1310, 1312, and 1314 are shown in rows. The input image for each individual is shown in column 702, resulting face and hair mesh from the front and side are shown in columns 1302' and 1302", respectively. The next two columns are 1302''' and 1302'''' are front and side views of the combined facial texture and three-dimensional model with the fully-rendered hair. An animated example of the three-dimensional model including the polystrip hair is shown in column 1302'''''.

As can be seen, the resulting three-dimensional models with polystrip hair are convincing. They are based upon a single input image. The methods and systems described generate photorealistic results from a single input image across various facial structures, from faces in different poses, and for a wide array of skin and facial tones and textures as well as various hairstyles.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for generating a digital facial avatar, the system comprising a processor and memory, the processor executing instructions which cause the processor to:
   receive an image of a human face including visible hair;
   separate facial regions of the human face from hair regions within the image;
   generate a facial texture map for the facial regions using a deep neural network to segment and reconstruct the facial texture map using a low frequency albedo map to extract facial landmarks and a high frequency albedo map to generate facial textures;
   classify hair attributes into a series of categories to identify a reduced dataset of polystrip hairstyles from a hairstyle database that includes the categories;
   identify a polystrip hairstyle from the reduced dataset that most closely matches the hair regions;
   perform hairstyle mesh fitting to generate a fitted hairstyle by altering the three-dimensional characteristics of the polystrip hairstyle to more closely match the hair regions;
   perform polystrip matching optimization to correct for portions of the fitted hairstyle that are uncovered by a polystrip to generate a final polystrip hairstyle;
   select and apply a texture to each polystrip in the final polystrip hairstyle;
   combine the facial texture map and the final polystrip hairstyle into a digital avatar; and
   output the digital avatar as a three-dimensional model.

2. The system of claim 1 wherein the facial texture map is generated by the processor executing instructions which cause the processor to:
   generate a low frequency albedo map for an entirety of the human face from the image, including any portion of at least a part of the human face not visible in the image, by using a deep neural network to perform facial segmentation and landmark detection to match three-dimensional facial geometry and thereby extract the visible facial texture map to compute corresponding feature correlation matrices;
   generate a high frequency albedo map for only the at least a part of the human face visible within the image;
   analyze a portion of the high frequency albedo map to identify a coefficient matrix for a convex combination of partial feature correlations from a database of high-resolution texture maps of actual human faces;
   linearly combine multiple high-resolution images of facial textures using the coefficient matrix and blend-weights to ensure that a resulting combination is within a target feature correlation range identified by the convex combination of partial feature correlations to thereby generate the feature correlation matrices of the full face; and
   generate a full-face high frequency albedo map for the image by selecting the high frequency albedo map for the entirety of the human face that minimizes the sum of the correlation matrix and the feature matrix to thereby select the full-face high frequency albedo map that most corresponds to the image.

3. The system of claim 1 wherein the polystrip hairstyle is identified by comparing a set of two-dimensional images associated with each polystrip hairstyle to a silhouette of the input image.

4. The system of claim 1 wherein the mesh fitting includes deformation of each polystrip of the polystrip hairstyle using a smooth warping function.

5. The system of claim 1 wherein the polystrip matching optimization includes instructions which cause the processor to:
test alpha values for transparency of each polystrip at zero and 1 to determine if the underlying scalp is visible in both instances at a region; and
when the scalp is visible, apply a new polystrip as an average of two polystrips nearest to the region.

6. The system of claim 1 wherein the categories are text-based categories identified by a trained neural network as associated with particular two-dimensional images and three-dimensional polystrip hairstyle models making up the reduced dataset.

7. A method of generating digital facial avatar comprising:
receiving an image of a human face including visible hair;
separating facial regions of the human face from hair regions within the image;
generating a facial texture map for the facial regions using a deep neural network to segment and reconstruct the facial texture map using a low frequency albedo map to extract facial landmarks and a high frequency albedo map to generate facial textures;
classifying hair attributes into a series of categories to identify a reduced dataset of polystrip hairstyles from a hairstyle database that includes the categories;
identifying a polystrip hairstyle from the reduced dataset that most closely matches the hair regions;
performing hairstyle mesh fitting to generate a fitted hairstyle by altering the three-dimensional characteristics of the polystrip hairstyle to more closely match the hair regions;
performing polystrip matching optimization to correct for portions of the fitted hairstyle that are uncovered by a polystrip to generate a final polystrip hairstyle;
selecting and apply a texture to each polystrip in the final polystrip hairstyle;
combining the facial texture map and the final polystrip hairstyle into a digital avatar; and
outputting the digital avatar as a three-dimensional model.

8. The method of claim 7 wherein the facial texture map is generated by:
generating a low frequency albedo map for an entirety of the human face from the image, including any portion of at least a part of the human face not visible in the image, by using a deep neural network to perform facial segmentation and landmark detection to match three-dimensional facial geometry and thereby extract the visible facial texture map to compute corresponding feature correlation matrices;
generating a high frequency albedo map for only the at least a part of the human face visible within the image;
analyzing a portion of the high frequency albedo map to identify a coefficient matrix for a convex combination of partial feature correlations from a database of high-resolution texture maps of actual human faces;
linearly combining multiple high-resolution images of facial textures using the coefficient matrix and blend-weights to ensure that a resulting combination is within a target feature correlation range identified by the convex combination of partial feature correlations to thereby generate the feature correlation matrices of the full face; and
generating a full-face high frequency albedo map for the image by selecting the high frequency albedo map for the entirety of the human face that minimizes the sum of the correlation matrix and the feature matrix to thereby select the full face high frequency albedo map that most corresponds to the image.

9. The method of claim 7 wherein the polystrip hairstyle is identified by comparing a set of two-dimensional images associated with each polystrip hairstyle to a silhouette of the input image.

10. The method of claim 7 wherein the mesh fitting includes deformation of each polystrip of the polystrip hairstyle using a smooth warping function.

11. The method of claim 7 wherein the polystrip matching optimization includes:
testing alpha values for transparency of each polystrip at zero and 1 to determine if the underlying scalp is visible in both instances at a region; and
when the scalp is visible, applying a new polystrip as an average of two polystrips nearest to the region.

12. The method of claim 7 wherein the categories are text-based categories identified by a trained neural network as associated with particular two-dimensional images and three-dimensional polystrip hairstyle models making up the reduced dataset.

13. An apparatus comprising a storage medium storing a program having instructions which when executed by a processor will cause the processor to:
receive an image of a human face including visible hair;
separate facial regions of the human face from hair regions within the image;
generate a facial texture map for the facial regions using a deep neural network to segment and reconstruct the facial texture map using a low frequency albedo map to extract facial landmarks and a high frequency albedo map to generate facial textures;
classify hair attributes into a series of categories to identify a reduced dataset of polystrip hairstyles from a hairstyle database that includes the categories;
identify a polystrip hairstyle from the reduced dataset that most closely matches the hair regions;
perform hairstyle mesh fitting to generate a fitted hairstyle by altering the three-dimensional characteristics of the polystrip hairstyle to more closely match the hair regions;
perform polystrip matching optimization to correct for portions of the fitted hairstyle that are uncovered by a polystrip to generate a final polystrip hairstyle;
select and apply a texture to each polystrip in the final polystrip hairstyle;
combine the facial texture map and the final polystrip hairstyle into a digital avatar; and
output the digital avatar as a three-dimensional model.

14. The apparatus of claim 13 wherein the facial texture map is generated by the processor executing instructions which cause the processor to:
generate a low frequency albedo map for an entirety of the human face from the image, including any portion of at least a part of the human face not visible in the image, by using a deep neural network to perform facial segmentation and landmark detection to match three-dimensional facial geometry and thereby extract the visible facial texture map to compute corresponding feature correlation matrices;

generate a high frequency albedo map for only the at least a part of the human face visible within the image;

analyze a portion of the high frequency albedo map to identify a coefficient matrix for a convex combination of partial feature correlations from a database of high-resolution texture maps of actual human faces;

linearly combine multiple high-resolution images of facial textures using the coefficient matrix and blend-weights to ensure that a resulting combination is within a target feature correlation range identified by the convex combination of partial feature correlations to thereby generate the feature correlation matrices of the full face; and generate a full-face high frequency albedo map for the image by selecting the high frequency albedo map for the entirety of the human face that minimizes the sum of the correlation matrix and the feature matrix to thereby select the full-face high frequency albedo map that most corresponds to the image.

15. The apparatus of claim 13 wherein the polystrip hairstyle is identified by comparing a set of two-dimensional images associated with each polystrip hairstyle to a silhouette of the input image.

16. The apparatus of claim 13 wherein the mesh fitting includes deformation of each polystrip of the polystrip hairstyle using a smooth warping function.

17. The apparatus of claim 13 wherein the polystrip matching optimization includes instructions which cause the processor to:

test alpha values for transparency of each polystrip at zero and 1 to determine if the underlying scalp is visible in both instances at a region; and when the scalp is visible, apply a new polystrip as an average of two polystrips nearest to the region.

18. The apparatus of claim 13 wherein the categories are text-based categories identified by a trained neural network as associated with particular two-dimensional images and three-dimensional polystrip hairstyle models making up the reduced dataset.

19. The apparatus of claim 13 further comprising:

the processor;

a memory; and wherein the processor and the memory comprise circuits and software for performing the instructions on the storage medium.

* * * * *